(12) United States Patent
Hong et al.

(10) Patent No.: US 10,063,285 B2
(45) Date of Patent: Aug. 28, 2018

(54) ANTENNA DEVICE OF ELECTRONIC APPARATUS

(71) Applicant: Samsung Electronics Co., Ltd., Gyeonggi-do (KR)

(72) Inventors: Won-Bin Hong, Seoul (KR); Myung-Ha Kuh, Gyeonggi-do (KR); Jae-Hwa Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/027,243

(22) PCT Filed: Aug. 22, 2014

(86) PCT No.: PCT/KR2014/007808
§ 371 (c)(1),
(2) Date: Apr. 4, 2016

(87) PCT Pub. No.: WO2015/050318
PCT Pub. Date: Apr. 9, 2015

(65) Prior Publication Data
US 2016/0254842 A1    Sep. 1, 2016

(30) Foreign Application Priority Data
Oct. 4, 2013    (KR) ........................ 10-2013-0118354

(51) Int. Cl.
*H01Q 1/36* (2006.01)
*H04B 5/00* (2006.01)
(Continued)

(52) U.S. Cl.
CPC ............. *H04B 5/0037* (2013.01); *H01Q 1/36* (2013.01); *H01Q 1/50* (2013.01); *H01Q 9/27* (2013.01);
(Continued)

(58) Field of Classification Search
CPC ............... H01Q 1/36; H01Q 1/50; H01Q 9/27
See application file for complete search history.

(56) References Cited

U.S. PATENT DOCUMENTS 6,061,025 A    5/2000   Jackson et al.
6,300,919 B1  10/2001   Mehen et al.
(Continued)

FOREIGN PATENT DOCUMENTS

CN    103069687 A    4/2013
CN    203103497 U    7/2013
(Continued)

OTHER PUBLICATIONS

International Search Report dated Oct. 29, 2014 in connection with Internatoinal Application No. PCT/KR2014/007808; 4 pages.
(Continued)

*Primary Examiner* — Hoang Nguyen (57) ABSTRACT

An antenna device of an electronic apparatus, according to embodiments of the present invention, includes radiation patterns comprising: at least one open boundary; and a plurality of radiation sections having the open boundary placed and arranged therebetween, wherein the radiation pattern forms a resonant frequency in a first frequency band (hereinafter, referred to as "a first resonance frequency") and at least one among the radiation sections can form a resonant frequency in a second frequency band (hereinafter, referred to as "a second resonant frequency band") higher than the first resonant frequency. The antenna device of the electronic apparatus, according to the present invention, can be implemented through other various embodiments.

17 Claims, 9 Drawing Sheets

(51) Int. Cl.
*H01Q 9/27* (2006.01)
*H01Q 1/50* (2006.01)

(52) U.S. Cl.
CPC ......... *H04B 5/0081* (2013.01); *H04B 5/0093* (2013.01)

(56) References Cited

U.S. PATENT DOCUMENTS

| | | | |
|---|---|---|---|
| 2006/0079177 | A1 | 4/2006 | Okubora |
| 2008/0158092 | A1 | 7/2008 | Yakubo et al. |
| 2010/0117454 | A1 | 5/2010 | Cook et al. |
| 2011/0279348 | A1* | 11/2011 | Hossain ............ H01Q 9/42 343/895 |
| 2012/0049647 | A1 | 3/2012 | Kim et al. |
| 2013/0049481 | A1 | 2/2013 | Kudo et al. |
| 2013/0062962 | A1 | 3/2013 | Xue et al. |
| 2013/0076154 | A1 | 3/2013 | Baarman et al. |
| 2013/0082537 | A1 | 4/2013 | Kim et al. |

FOREIGN PATENT DOCUMENTS

| | | |
|---|---|---|
| EP | 2387110 A1 | 11/2011 |
| KR | 10-2005-0015364 A | 2/2005 |
| KR | 10-2008-0061274 A | 7/2008 |
| KR | 10-2010-0028224 A | 3/2010 |
| KR | 10-2013-0025444 A | 3/2013 |

OTHER PUBLICATIONS

Written Opinion of the International Searching Authority dated Oct. 29, 2014 in connection with Internatoinal Application No. PCT/KR2014/007808; 4 pages.

Petosa, et al., "An Overview of Tuning Techniques for Frequency-Agile Antennas", IEEE Antennas and Propagation Magazine, vol. 54, No. 5, Oct. 2012, pp. 271-296.

Foreign Communication from Related Counterpart Application, European Patent Application No. 14850292.5, Supplementary European Search Report and European Search Opinion dated Apr. 6, 2017, 10 pages.

Chinese Office Action for Chinese Application No. 201480054943.0, dated Dec. 4, 2017. (18 pages).

Communication from a foreign patent office in a counterpart foreign application, State Intellectual Property Office of the People's Republic of China, "The Second Office Action," Application No. CN201480054943.0, Jul. 4, 2018, 15 pages.

* cited by examiner

ANTENNA DEVICE OF ELECTRONIC APPARATUS

CROSS-REFERENCE TO RELATED APPLICATIONS AND CLAIM OF PRORITY

The present application claims priority under 35 U.S.C. § 365 to International Patent Application No. PCT/KR2014/007808 filed Aug. 22, 2014, entitled "ANTENNA DEVICE OF ELECTRONIC APPARATUS", and, through International Patent Application No. PCT/KR2014/007808, to Korean Patent Application No. 10-2013-0118354 filed Oct. 4, 2013, each of which are incorporated herein by reference into the present disclosure as if fully set forth herein.

TECHNICAL FIELD

Various embodiments of the present disclosure relate to an antenna device.

BACKGROUND ART

The development of wireless communication technologies enables data transmission/reception and data sharing between different electronic devices. For example, it is possible to directly transmit a multimedia file, which includes an image file stored in, for example, a digital camera or a multimedia reproducer, to a smart phone or a notebook computer. A data transmission technology between electronic devices may also be usefully used in a medical field. For example, information about a patient, which is obtained from a medical electronic device (e.g., an Electro-CardioGraphy (ECG) sensor to be attached to a human body) may be transmitted to, for example, a Personal Computer (PC) or a mobile communication terminal. Such inter-device information transmission may be performed through a communication method (e.g., wireless LAN, Bluetooth, or Near Field Communication (NFC)).

Meanwhile, power transmission/reception, as well as ordinary communication, has also recently been implemented in a wireless manner, rather than a wired manner. In order to transmit/receive power in a wireless manner, a device that receives power (e.g., an electronic device such as a mobile communication terminal) is provided with a secondary coil or a resonance circuit. The secondary coil or the resonance circuit equipped in an electronic device receives power from a primary coil or a resonance circuit equipped in a power transmission device (e.g., a wireless charger), in an electromagnetic induction manner or a resonance manner.

DETAILED DESCRIPTION OF THE INVENTION

Technical Problem

An electronic device, such as a notebook computer or a PC, may provide a space that is sufficient for mounting various types of antenna devices. However, it is difficult to secure a space for mounting an antenna device to some devices due to the size thereof. For example, a miniaturized and lightened electronic device (e.g., a mobile communication terminal) practically has a space that is narrow to mount an antenna device therein. In addition, in the actual situation where antenna devices of different communication standards (e.g., a mobile communication network connection antenna, a wireless LAN antenna, a Bluetooth antenna, and an NFC antenna) are mounted to an electronic device, there is a difficulty in securing a space for mounting an antenna device for wireless power transmission/reception.

Accordingly, the present disclosure is intended to provide an antenna device for an electronic device, which may be easily installed even within a narrow space through various embodiments.

In addition, the present disclosure is intended to provide an antenna device for an electronic device, which may be operably merged to different communication methods through various embodiments.

Technical Solution

An antenna device of an electronic device, according to embodiments of the present invention, may include a radiation pattern that includes at least one open boundary and a plurality of radiation units that are arranged with the open boundary being interposed therebetween.

The radiation pattern may form a resonance frequency in a first frequency band (hereinafter, referred to as a "first resonance frequency"), and at least one of the radiation units may form a resonance frequency in a second frequency band (hereinafter, referred to as a "second resonance frequency") that is higher than the first frequency band.

The open boundary may form a short circuit for a signal current in the first frequency band, and may form an open circuit for a signal current in the second frequency band.

The length of the open boundary may be formed to be smaller than ¼ of a signal wavelength of the second resonance frequency.

In a certain embodiment, the antenna device may further include an active element that is arranged in the open boundary so as to electrically short-circuit or open the radiation units, which are arranged to be adjacent to each other with the open boundary being interposed therebetween.

The active element may include a PIN diode, a Micro-ElectroMechanical System (MEMS) switch, a bandpass filter, a low pass filter, or a Single Pole Single Throw (SPST) switch.

In a certain embodiment, the first frequency band may be a frequency band in the range of 5 MHz to 15 MHz.

In another embodiment, the second frequency band may be a frequency band in the range of 700 MHz to 65 GHz.

In configuring the radiation pattern, a plurality of open boundaries and the radiation units may be alternately arranged to form a spiral shape.

In a certain embodiment, in configuring the radiation pattern, the open boundary may be arranged to surround a first radiation unit among the radiation units, and a second radiation unit among the radiation units may arranged to surround the open boundary.

In still another embodiment, some of the radiation units may be combined with each other to form a resonance frequency in a third frequency band that is higher than the first frequency band, and is different from the second frequency band.

In a certain embodiment, the radiation pattern may be any one of a Archimedean spiral pattern, a log periodic spiral pattern, and a cavity-backed log periodic spiral pattern, in which a plurality of lines are arranged in a spiral shape that converges on a center.

In another embodiment, the radiation pattern may include, among the radiation units, a first radiation unit that is surrounded by the open boundary, and a second radiation unit that is arranged to surround the open boundary.

In the case of surrounding the open boundary, the second radiation may have a closed loop shape.

In the antenna device as described above, the first radiation unit may include a portion that protrudes in a direction approaching the second radiation unit.

Advantageous Effects

An antenna device, according to the embodiments of the present disclosure, apparently forms a single antenna device by forming an open boundary between a plurality of radiation units in forming a radiation pattern. However, the antenna device may form different resonance frequencies in different frequency bands. For example, the antenna device may form a resonance frequency in a 6 MHz band for wireless power transmission/reception, and may form another resonance frequency in a higher frequency band (e.g., a super-high frequency band of dozens of GHz or more). Accordingly, the antenna device can be easily installed even in an electronic device having a restricted installation space, such as a mobile communication terminal.

MODE FOR CARRYING OUT THE INVENTION

Hereinafter, various embodiments of the present disclosure will be described in detail with reference to the accompanying drawings. In the description of the embodiments of the present disclosure, when it is determined that a detailed description of related well-known functions or structures causes confusion in the subject matter of the present disclosure, the description will be omitted. In addition, terms described later are defined in consideration of functions in the embodiment, but they may be replaced with other terms according to intention of a user or an operator, or a practice. Therefore, the terms will be defined more definitely through the description of the various embodiments of the present disclosure. Further, in the description of the embodiments of the present invention, a use of an ordinal number such as first and second is to distinguish objects having identical names from one another, and an order of the objects may be determined arbitrarily.

According to embodiments of the present disclosure, an antenna device of an electronic device may be provided with a radiation pattern that includes a plurality of radiation units, the radiation pattern may form a resonance frequency in a first frequency band, and at least one of the radiation units may form a resonance frequency in a second frequency band that is higher than the first frequency band. For example, among the radiation units, a radiation unit, which forms the resonance frequency in the second frequency band, may operate as a portion of the radiator of the antenna device even when the resonance frequency is formed in the frequency band. The first frequency band may be set as a wireless power transmission/reception frequency band in the range of 5 MHz to 15 MHz (e.g., 6.78 MHz or 13.56 MHz), and the second frequency band may be set as a super-high frequency band in the range of 700 MHz to 800 MHz, 1.8 GHz, 2.1 GHz, or in the range of dozens of GHz to 65 GHz.

Figure 1:
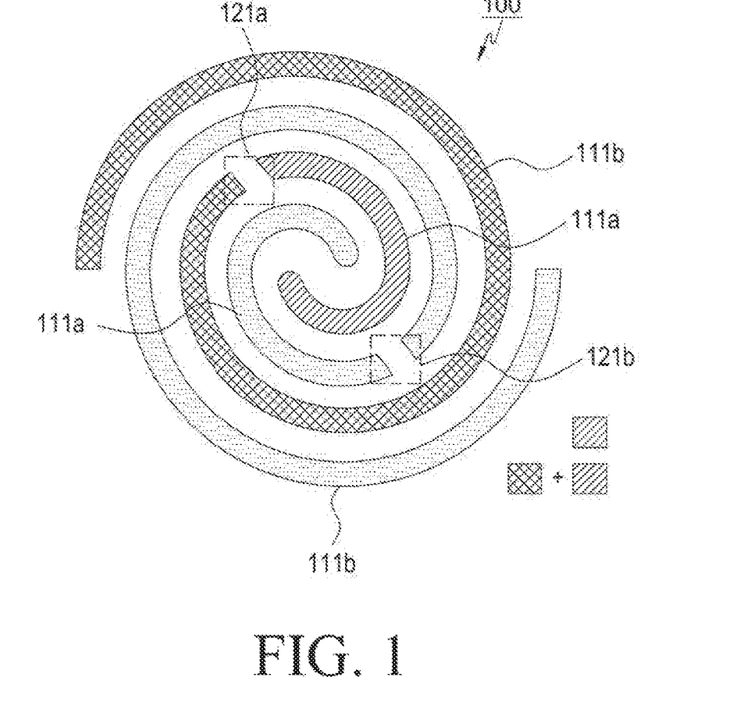
FIG. 1 is a diagram illustrating a radiation pattern of an antenna device according to embodiments of the present disclosure.

FIG. 1 is a diagram illustrating a radiation pattern of an antenna device according to embodiments of the present disclosure.

As illustrated in FIG. 1, an antenna device, according to embodiments of the present disclosure, may be provided with a radiation pattern 100 that includes a plurality of radiation units 111a and 111b with open boundaries 121a and 121b being interposed therebetween. Each of the radiation units 111a and 111b may extend in the form of a line or a strap, and the radiation units 111a and 111b may be arranged in the form of a spiral with the open boundaries 121a and 121b being interposed therebetween. While the specific embodiment of the present disclosure exemplifies that the arrangement of the radiation units 111a and 111b are formed in the form of a spiral, the present disclosure is not limited thereto. For example, the radiation units 111a and 111b may be arranged in the form of concentric circles or a plurality of loops.

The radiation units may include a radiation unit 111a that is positioned at the center side of the spiral shape (hereinafter, referred to as a "first radiation unit"), and a radiation unit 111b that is positioned at the edge side of the spiral shape (hereinafter, referred to as a "second radiation unit"). The open boundaries 121a and 121b may be positioned between the first and second radiation units 111a and 111b. The first radiation unit 111a, the opening boundaries 121a and 121b, and the second radiation units 111b may be sequentially arranged to form a line or strap shape. In a certain embodiment, the radiation pattern 100 may include three or more radiation units, and the radiation units and the open boundaries may be alternately arranged. In alternately arranging the three or more radiation units and the open boundaries, it is evident that the radiation units and the open boundaries may be arranged in various forms of, for example, an opened loop, a closed loop, and a meander line, rather than being arranged to form one line or a spiral in the form of a strap.

Depending on the frequency band of an applied signal current, the radiation pattern 100 may operate as a radiator in a state where the radiation unit 111a, the open boundaries 121a and 121b, and the second radiation unit 111b form an electric length, or may form a radiator in a state where only one of the first and second radiation units forms the electric length. The open boundaries 121a and 121b may selectively operate as a short circuit or an opening circuit on the radiation pattern 100. Accordingly, the entire radiation pattern 100 may be used as a radiator to form a resonance frequency in the first frequency band (hereinafter, referred to as a "first resonance frequency"), and as only one of the first and second radiation units 111a and 111b forms the electric length, only a portion of the radiation pattern 100 may be used as a radiator to form a resonance frequency in the second frequency band (hereinafter, referred to as a "second resonance frequency"). Considering the configuration of the radiation pattern 100 as described above, a person ordinarily skilled in the art may easily understand that the second frequency band will be formed to be higher than the first frequency band.

The electric length formed by the whole or a portion of the radiation pattern 100 may be controlled by using an impedance that is formed by the open boundaries 121a and 121b or an active element that is arranged in each of the open boundaries 121a and 121b. Such a configuration will be described in more detail with reference to FIG. 2.

Figure 2:
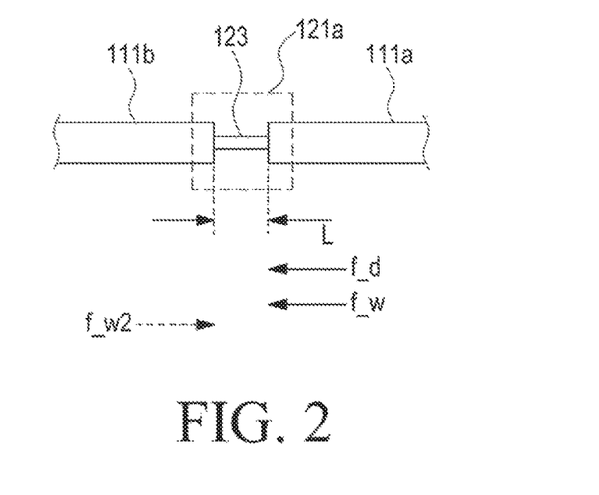
FIG. 2 is a view illustrating an open boundary of the antenna device according to embodiments of the present disclosure in an enlarged scale.

FIG. 2 is a view illustrating an open boundary of the antenna device according to embodiments of the present disclosure in an enlarged scale.

The open boundary 121a may be formed merely by removing a portion of the radiation pattern 100 between the first and second radiation units 111a and 111b, and according to an embodiment, an active element 123 may be arranged in the open boundary 121a so as to short-circuit or open the first and second radiation units 111a and 111b.

First, a configuration in which the active element 123 is not arranged in the open boundary 121a will be described.

On the radiation pattern 100, the impedance to be formed in the open boundary 121a may be defined by Equation 1 and Equation 2 as follows.

$$Z = jwL \qquad \text{Equation 1}$$

$$w = 2\pi f \qquad \text{Equation 2}$$

Here, "Z" represents the impedance of the open boundary 121a, and "wL" represents an inductive reactance formed by the open boundary 121a, in which "L" means the inductance of the open boundary 121a, which may be determined based on the length L of the open boundary 121a (e.g., the distance between the first and second radiation units 111a and 111b). "f" means the frequency of a signal current that is applied to the radiation pattern 100.

After the radiation pattern 100 is fabricated and completed, the length L of the open boundary 121a is fixed. Thus, according to Equation 1 and Equation 2, it may be understood that the impedance formed by the open boundary 121a is determined based on the frequency of a signal current that is applied to the radiation pattern 100. For example, the impedance formed by the open boundary 121a may be proportional to the frequency of the signal current that is applied to the radiation pattern 100.

As a frequency band that is used for power transmission/reception, the 6.78 MHz band and the 13.56 MHz band are designated as the international standards. In commercialized mobile communication networks, various frequency bands (e.g., the 700 to 800 MHz band, the 1.8 GHz band, and the 2.1 GHz band) are used, and it is expected that in the future, a commercial communication network will be configured in a super-high frequency band of dozens of GHz or more. Accordingly, the open boundary 121a may operate as a short circuit for a signal current in the above-mentioned wireless power transmission/reception frequency band, and may operate as an open circuit for a signal current in a commercialized mobile communication frequency band. For example, in a low frequency band, such as the wireless power transmission/reception band, the entire radiation pattern 100 including the open boundary 121a may provide an electric length so as to form a resonance frequency, and in a higher frequency band, only a portion of the radiation units 111a and 111b may provide an electric length so as to form the second resonance frequency.

Meanwhile, depending on the frequency band in which the radiation pattern 100 operates, (e.g., depending on the use, such as wireless power transmission/reception or data communication), it may be necessary to adjust the length of the open boundary 121a. Hereinafter, as an example, descriptions will be made on a configuration in which the antenna device, according to the embodiments of the present disclosure, operates in the frequency band of 6.78 MHz for wireless power transmission/reception and in the frequency band of 2.1 GH for data communication.

When the open boundary 121a has impedance in the range of 0.01Ω to 500Ω with respect to the frequency of a signal current, the open boundary 121a may operate as the short circuit. Accordingly, in order to operate as the short circuit in the frequency band of 6.78 MHz, the open boundary 121a may have a length of 0.1 mm to 44.247 mm. In addition, in the frequency band of 2.1 GHz, the open boundary 121a may operate as the open circuit in the same length condition. By designing the length of the open boundary 121a in the range of 0.1 to 44.247 mm in consideration of such a condition, the open boundary 121a may operate as the short circuit in the frequency band of 6.78 MHz, and may operate as the open circuit in the frequency band of 2.1 GHz. However, the length of the open boundary 121a may be properly designed in consideration of the actual size of a device, to which the antenna device, which uses the radiation pattern 100, is applied. Therefore, the radiation pattern 100 may form the first resonance frequency when its entire physical length is used as a radiator, and may form the second resonance frequency in a band that is higher than the first resonance frequency when only a portion of the radiation units is used as a radiator.

In setting the length of the open boundary 121a as described above, the length may be formed to be smaller than ¼ of the wavelength of the higher resonance frequency among the frequency bands to be transmitted/received through the radiation pattern 100.

In this way, the antenna device, according to embodiments of the present disclosure, enables wireless communication in a high frequency band by using a portion of the radiation pattern in the low frequency band. For example, in the case of an antenna device for wireless power transmission/reception, which is operated in a low frequency band, the antenna device may also be used as an antenna device for data communication, which is operated in a high frequency band while a portion of the radiation pattern for wireless power transmission/reception is still used for wireless power transmission/reception, through embodiments of the present disclosure.

In another embodiment, as described above, an active element 123 may be arranged in the open boundary 121a so as to short-circuit or open the first and second radiation units 111a and 111b. The active element 123 may include a PIN diode, a MEMS switch, a bandpass filter, a low pass filter, or an SPST switch. In the case where a PIN diode is used as the active element 123, the flowing direction of the signal current of the second frequency band (f_d) which flows in the radiation pattern 100 will be set to be opposite to the flowing direction of the signal current of the first frequency band (f_w2), and the active element 123 may cut off a signal current that flows in any one direction (e.g., the signal current of the second frequency band (f_d)). In the case where a filter or switch type active element is used, in the open boundary 121a, a short circuit may be formed for the signal current in the first frequency band, and an open circuit may be formed in the second frequency band depending on the frequency characteristic or the switching operation of the active element 123. Accordingly, when the filter type or switch type active element is arranged in the open boundary 121a, the flowing direction of the signal current of the second frequency band (f_d) that flows in the radiation pattern 100 may be set to be the same as the flowing direction of the signal current of the first frequency band (f_w).

Figure 3:
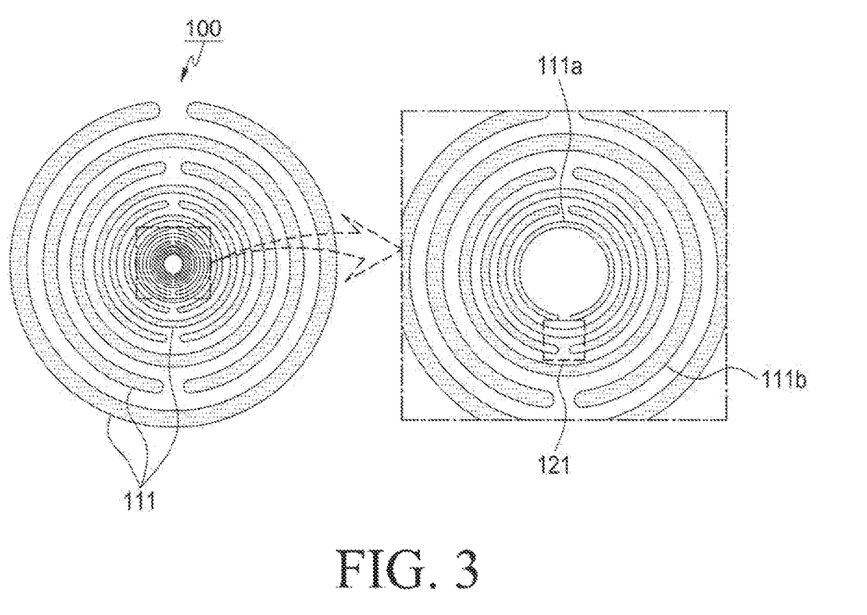
FIG. 3 is a diagram illustrating a radiation pattern of an antenna device according to the first one of embodiments of the present disclosure.

FIG. 3 is a diagram illustrating a radiation pattern of an antenna device according to the first one of embodiments of the present disclosure.

The radiation pattern 100a of the antenna device illustrated in FIG. 3 has a configuration in which partially opened loop-shaped radiation units 111 are in the form of concentric circles. An open boundary 121 is formed at a position that is spaced apart from the center of the radiation pattern 100a, and the radial width or the circumferential length of the open boundary 121 may be set in consideration of an impedance component of the open boundary 121. The width or the length of the open boundary 121 may be set in consideration of the frequency band in which the radiation pattern 100a operates, and in consideration of the impedance value obtained by the open boundary 121 according to a frequency band, as described above in the preceding embodiment. According to an embodiment, an active element may be arranged in the open boundary 121. The open boundary 121 may operate as a short circuit or an open circuit between a first radiation unit 111a that is positioned at the center side of the radiation pattern 100a and a second radiation pattern 111b that is positioned at the edge side of the radiation pattern 100a. For example, when the open boundary 121 operates as a short circuit for a signal current in the first frequency band, the open boundary may operate as an open circuit for a signal current of the second frequency band that is higher than the first frequency band.

Figure 4:
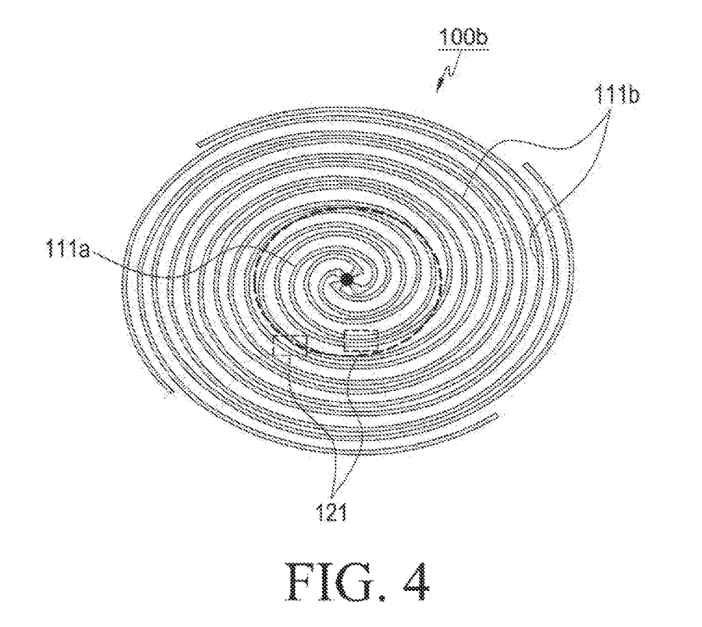
FIG. 4 is a diagram illustrating a radiation pattern of an antenna device according to the second one of embodiments of the present disclosure.
Figure 5:
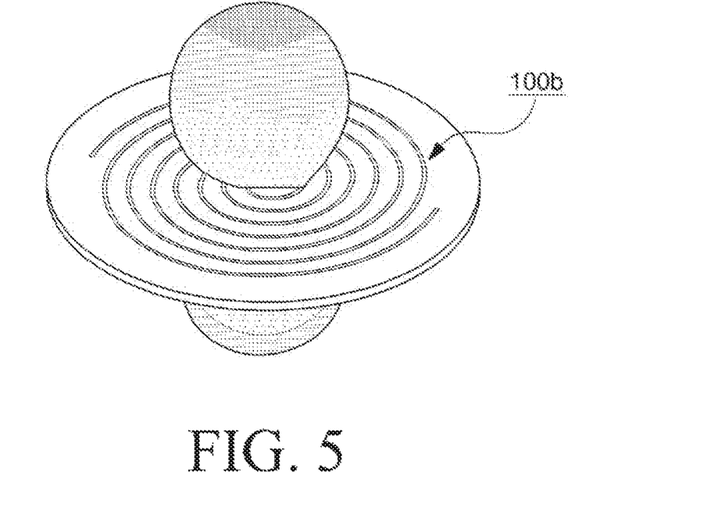
FIG. 5 is a view for describing a radiation characteristic of the antenna device according to the second one of various embodiments of the present disclosure.

FIG. 4 is a diagram illustrating a radiation pattern of an antenna device according to the second one of embodiments of the present disclosure. FIG. 5 is a view for describing a radiation characteristic of the antenna device according to the second one of various embodiments of the present disclosure.

The radiation pattern 100b of the antenna device illustrated in FIG. 4 is exemplified as having a configuration that is formed in an Archimedean spiral shape. The illustrated radiation pattern is in the form where multiple lines (e.g., four (4) lines) converge on one center, and an open boundary may be formed in each of the four lines. In the wireless power transmission/reception frequency band (e.g., the 6.78 MHz band), the open boundaries 121 may operate as short circuits so that the entire radiation pattern 100b may form a resonance frequency. In a data communication frequency band (e.g., a frequency band of 700 MHz, 1.8 GHZ, or 2.1 GHz or more), the open boundaries 121 may form open circuits. One of a first radiation unit 111a, which is positioned closer to the center side than the open boundaries 121 and a second radiation unit 111b, which is positioned closer to the edge side than the open boundaries 121, may form a resonance frequency.

FIG. 5 represents a radiation power that is measured when the open boundary 121 forms an open circuit, and only one of the first radiation unit 111a and the second radiation unit 111b forms a resonance frequency (e.g., when the radiation pattern is used for data communication). As illustrated in FIG. 5, when only one of the first radiation unit 111a and the second radiation unit 111b forms a resonance frequency in a configuration where the radiation pattern 100b of antenna device is formed in the Archimedean spiral shape according to embodiments of the present disclosure, it can be seen that the radiation pattern 100b may exhibit an omnidirectional or non-oriented radiation characteristic.

Figure 6:
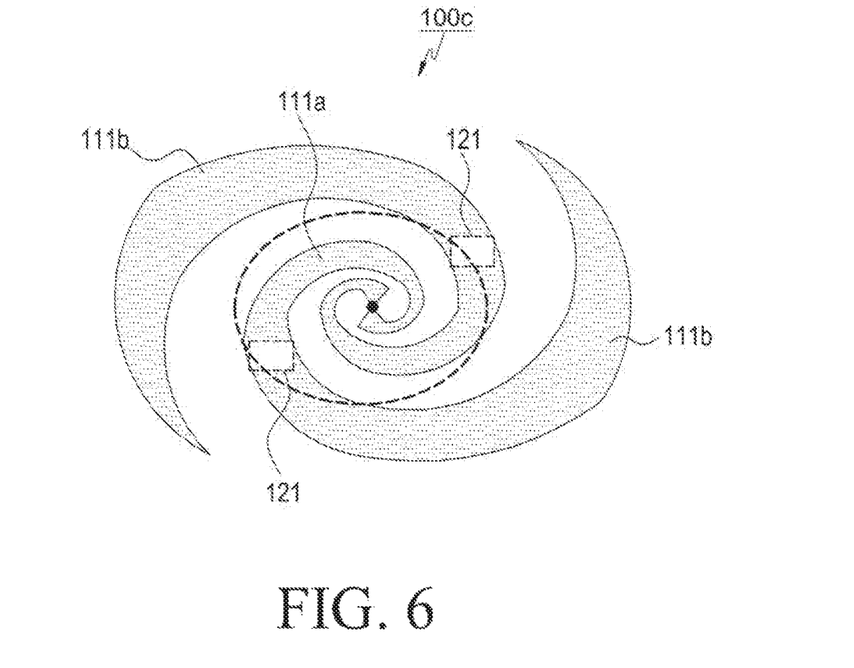
FIG. 6 is a diagram illustrating a radiation pattern of an antenna device according to the third one of embodiments of the present disclosure.
Figure 7:
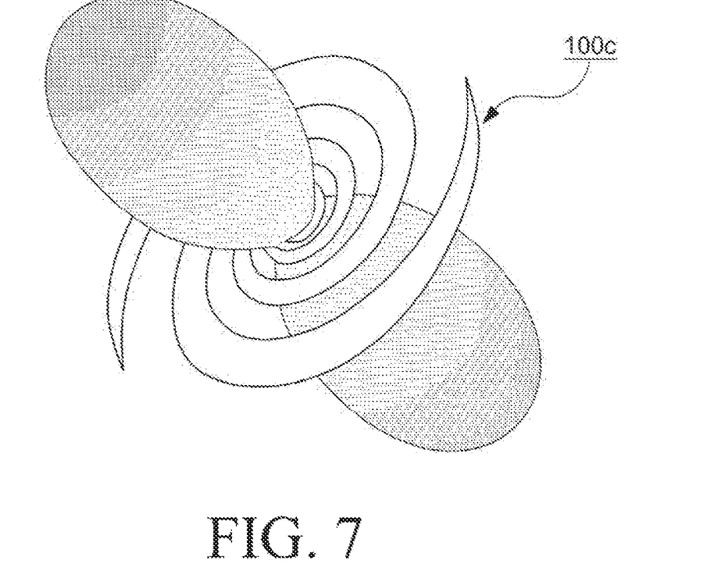
FIG. 7 is a view for describing a radiation characteristic of the antenna device according to the third one of various embodiments of the present disclosure.

FIG. 6 is a diagram illustrating a radiation pattern of an antenna device according to the third one of embodiments of the present disclosure. FIG. 7 is a view for describing a radiation characteristic of the antenna device according to the third one of various embodiments of the present disclosure.

FIG. 6 exemplifies a log periodic pattern as a radiation pattern 100c of the illustrated antenna device. For example, the illustrated radiation pattern 100c takes a form in which two patterns, of which the width gradually varies, converge on a center substantially in a spiral shape, and the open boundary 121 may be formed in each of the two patterns. By impedance depending on the length or width of the open boundary 121 or the characteristic of an active element that is arranged in the open boundary 121, the open boundary 121 may operate as a short circuit or an open circuit depending on the frequency of a signal current that is applied to the radiation pattern 100c.

FIG. 7 illustrates the radiation power of the radiation pattern 100c that is measured when the open boundary 121 forms an open circuit such that the first radiation unit 111a, which is positioned closer to the center side of the radiation pattern 100c than the open boundary 121, or the second radiation pattern 111b, which is positioned closer to the edge side than the open boundary 121, forms a resonance frequency. As illustrated in FIG. 7, when one of the first radiation unit 111a and the second radiation unit 111b forms a resonance frequency in a configuration where the radiation pattern 100c of antenna device is formed in the log periodic pattern according to embodiments of the present disclosure, it can be seen that the radiation pattern 100c may exhibit a directional radiation characteristic.

Figure 8:
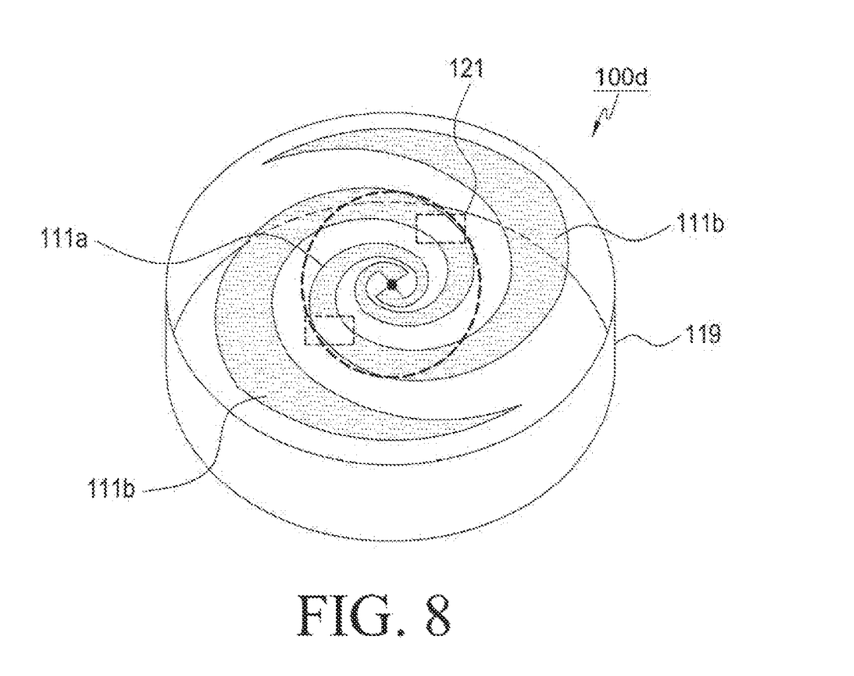
FIG. 8 is a diagram illustrating a radiation pattern of an antenna device according to the fourth one of embodiments of the present disclosure.
Figure 9:
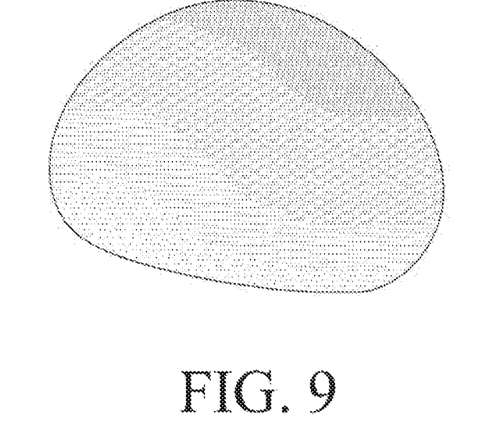
FIG. 9 is a view for describing a radiation characteristic of the antenna device according to the fourth one of various embodiments of the present disclosure.

FIG. 8 is a diagram illustrating a radiation pattern of an antenna device according to the fourth one of embodiments of the present disclosure. FIG. 9 is a view for describing a radiation characteristic of the antenna device according to the fourth one of various embodiments of the present disclosure.

FIG. 8 exemplifies a cavity-backed log periodic pattern as a radiation pattern 100*d* of an illustrated antenna device. The radiation pattern 100*d* has a configuration in which a log periodic pattern is accommodated in a cavity 119, and an open boundary 121 may be formed in each of two patterns. By impedance depending on the length or width of the open boundary 121 or the characteristic of an active element that is arranged in the open boundary 121, the open boundary 121 may operate as a short circuit or an open circuit depending on the frequency of a signal current that is applied to the radiation pattern 100*d*.

FIG. 9 represents a radiation power of the radiation pattern 100*d* that is measured when the open boundary 121 forms an open circuit, and one of the first radiation unit 111*a* and the second radiation unit 111*b*, rather than the open boundary 121, forms a resonance frequency. As illustrated in FIG. 9, when only one of the first radiation unit 111*a* and the second radiation unit 111*b* forms a resonance frequency in a configuration where the radiation pattern 100*d* of an antenna device is formed in a cavity-backed periodic pattern according to embodiments of the present disclosure, it can be seen that the radiation pattern 100*d* may exhibit a unidirectional radiation characteristic.

Figure 10:
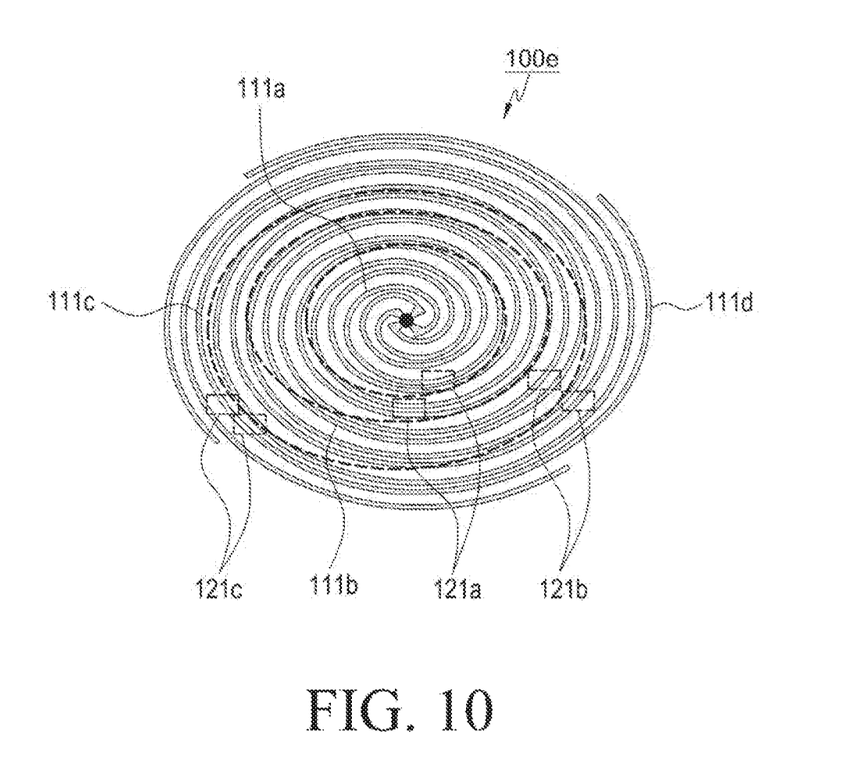
FIG. 10 is a diagram illustrating a radiation pattern of an antenna device according to the fifth one of embodiments of the present disclosure.
Figure 11:
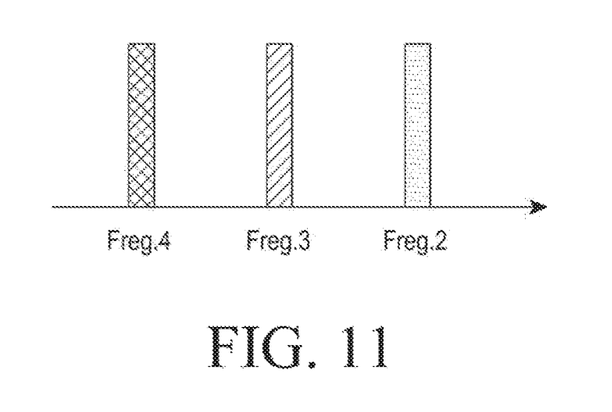
FIG. 11 is a view for describing an operation of the antenna device according to the fifth one of various embodiments of the present disclosure.

FIG. 10 is a diagram illustrating a radiation pattern of an antenna device according to the fifth one of embodiments of the present disclosure. FIG. 11 is a view for describing an operation of the antenna device according to the fifth one of various embodiments of the present disclosure.

Referring to FIGS. 10 and 11, the radiation pattern 100*e* is formed in an Archimedean spiral shape in which four lines of the radiation pattern 100*e* converge on a center while being arranged to form a spiral line, and three open boundaries 121*a*, 121*b*, and 121*c* are formed in each of the four lines. For the convenience of description, the open boundaries will be referred to as a "first open boundary," a "second open boundary," and a "third open boundary" in this order according to the distance from the center of the radiation pattern 100*e*. In addition, for the radiation units that are separated from each other by the open boundaries 121*a*, 121*b*, and 121*c*, the radiation unit, which is positioned closer to the center than the first open boundary 121*a*, will be referred to as a "first radiation unit 111*a*," the radiation unit, which is positioned between the first and second open boundaries 121*a* and 121*b*, will be referred to as a "second radiation unit 111*b*," the radiation unit, which is positioned between the second and third open boundaries 121*b* and 121*c*, will be referred to as a "third radiation unit 111*c*," and the radiation unit, which is positioned closer to the edge than the third open boundary 121*c*, will be referred to as a "fourth radiation unit 111*d*."

In a first frequency band (e.g., in the 6.78 MHz frequency band for wireless power transmission/reception), all the first to third open boundaries 121*a*, 121*b*, and 121*c* may operate as short circuits. Accordingly, the whole of the first to fourth radiation units 111*a*, 111*b*, 111*c*, and 111*d* may form a first resonance frequency (e.g., 6.78 MHz that is a wireless power transmission/reception frequency). When all the first to third open boundaries 121*a*, 121*b*, and 121*c* operate as open circuits, the first to fourth radiation units 111*a*, 111*b*, 111*c*, and 111*d* may form different resonance frequencies in a band that is different from that of the first resonance frequency. However, for a concise description, in the specific embodiment of the present disclosure, descriptions will be made on a configuration in which only the first radiation unit 111*a* forms the second resonance frequency when all the first to third open boundaries 121*a*, 121*b*, and 121*c* operate as open circuits.

Since the first radiation unit 111*a* is a portion of the radiation pattern 100*e*, when all the first to third open boundaries 121*a*, 121*b*, and 121*c* operate as open circuits, the second resonance frequency (e.g., 60 GHz) (Freq.2) may be formed in a band that is higher than the first resonance frequency that is formed by the whole of the first to fourth radiation units 111*a*, 111*b*, 111*c*, and 111*d*.

When the first open boundary 121*a* operates as a short circuit and the second and third open boundaries 121*b* and 121*c* operate as open circuits, the first and second radiations units 111*a* and 111*b* may be combined with each other to form a third resonance frequency (Freq.3). The third resonance frequency (Freq.3), which is formed by the combination of the first and second radiation units 111*a* and 111*b*, may be formed in a frequency band that is lower than the second resonance frequency (Freq.2) and higher than the first resonance frequency (e.g., the 2.1 GHz band).

When the first and second open boundaries 121*a* and 121*b* operate as short circuits and the third open boundary 121*c* operates as an open circuit, the first to third radiation units 111*a*, 111*b*, and 111*c* may be combined with each other to form a fourth resonance frequency (Freq.4). The fourth resonance frequency (Freq.4), which is formed by the combination of the first to third radiation units 111*a*, 111*b*, and 111*c* may be formed in a frequency band that is lower than the third resonance frequency (Freq.3) and higher than the first resonance frequency (e.g., the 700 MHz band).

While the descriptions made with reference to FIGS. 10 and 11 exemplify a configuration in which the combinations of radiations units are sequentially formed from the center of the radiation pattern, the present disclosure is not limited thereto. For example, in forming the second resonance frequency (Freq.2), only the third radiation unit may form the resonance frequency. In a certain embodiment, in forming the third resonance frequency (Freq.3), a combination of the third and fourth radiation units may form the resonance frequency.

As described above, an antenna device, according to embodiments of the present disclosure, may have a radiation pattern that is formed by three or more radiation units that form a radiation pattern, and may selectively short-circuit each of the radiation units. Accordingly, the antenna device may form a resonance frequency for data communication in various frequency bands, as well as a resonance frequency for wireless power transmission by using an apparently single radiation pattern. Each of the radiation units may be selectively short-circuited by causing an open boundary to operate as any one of a short circuit and an open circuit by using the impedance of the open boundary for the frequency of a signal current that is applied to the radiation pattern. In a certain embodiment, each of the radiation units may be selectively short-circuited by arranging an active element in the open boundary.

The preceding embodiments exemplify radiation patterns based on substantially spiral shapes. However, the radiation pattern of an antenna device, according to the present disclosure, is not limited thereto. For example, according to the embodiments of the present disclosure, the antenna device may include a radiation pattern in which different antenna structures, such as a radiation patch structure, a loop antenna structure, a micro-strip structure, and a meander line structure are combined with each other. A radiation pattern of an antenna device according to the sixth embodiment of the present disclosure is illustrated in FIG. 12.

Figure 12:
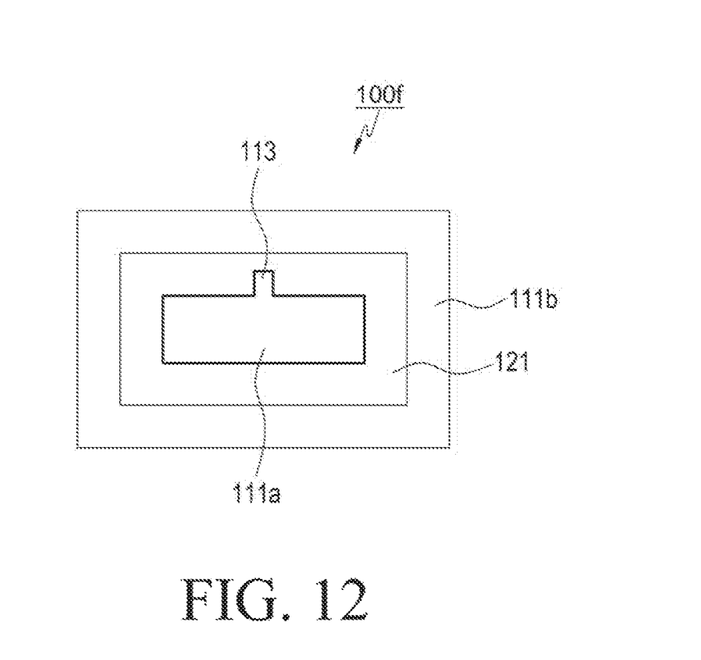
FIG. 12 is a diagram illustrating a radiation pattern of an antenna device according to the sixth one of embodiments of the present disclosure.

FIG. 12 is a diagram illustrating a radiation pattern of an antenna device according to the sixth one of embodiments of the present disclosure.

As illustrated in FIG. 12, the radiation pattern 100f may include a patch type first radiation unit 111a that is surrounded by an open boundary 121, and a second radiation unit 111b that is arranged to surround the open boundary 121.

The second radiation unit 111b may have a closed loop shape. In order to set the impedance of the open boundary 121, a portion 113 of the first radiation unit 111a may protrude in the direction approaching the second radiation unit 111b.

Figure 13:
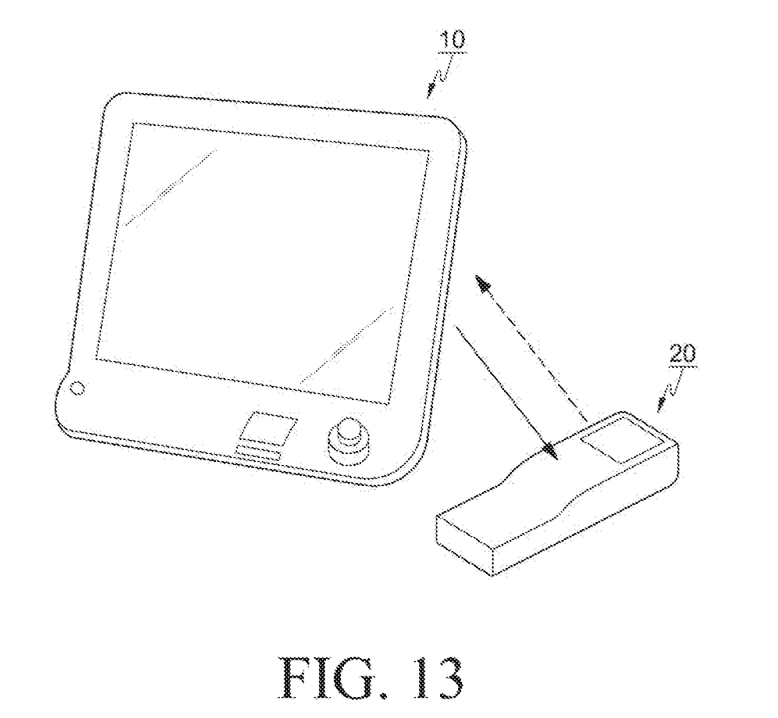
FIG. 13 is a diagram illustrating an example of an electronic device that is equipped with an antenna device according to embodiments of the present disclosure.

FIG. 13 is a diagram illustrating an example of an electronic device that is equipped with an antenna device according to embodiments of the present disclosure.

The electronic device 20 may be a medical probe (e.g., an ultrasonic probe). The electronic device 20 may transmit detected information (e.g., information about an ultrasonic image) to medical equipment 10. The medical probe, such as an ultrasonic probe, is generally connected to medical equipment via a wire in order to supply power and transmit detected image information. However, the electronic device 20, which is equipped with an antenna device including a radiation pattern, according to the embodiments of the present disclosure, may implement the charging of an embedded battery and the transmission of detected image information in a wireless manner. For example, in the radiation pattern of an antenna device according to the embodiments of the present disclosure, when an open boundary operates as a short circuit, the electronic device 20 may receive power from the medical equipment 10 in a wireless manner. During the detection of image information by the electronic device 20, the image information, which is detected while the open boundary operates as an open circuit, may be transmitted to the medical equipment 10.

Figure 14:
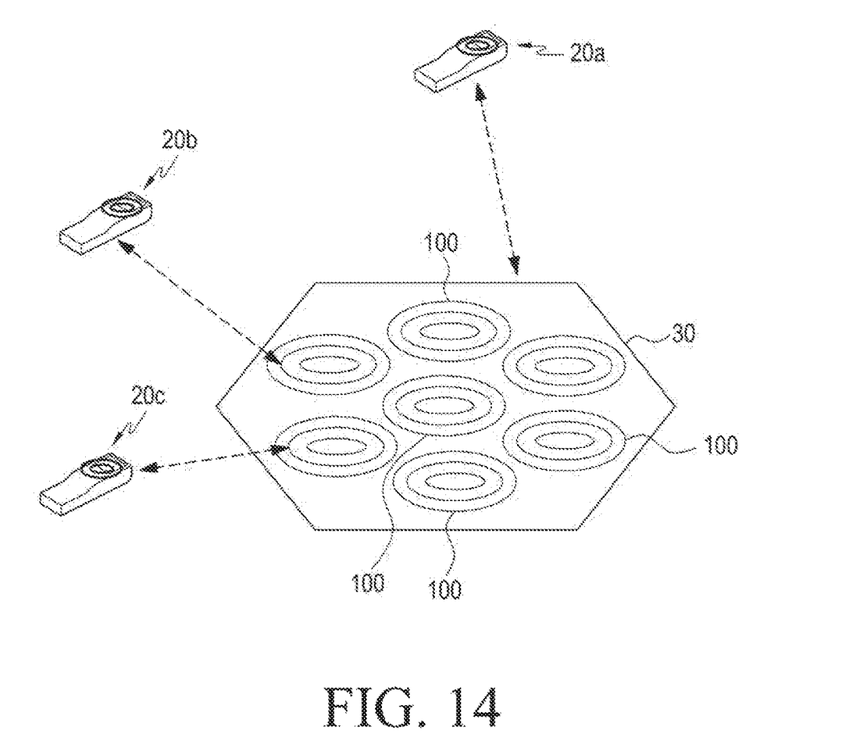
FIG. 14 is a diagram illustrating an application example of a medical probe that is equipped with an antenna device according to embodiments of the present disclosure.

FIG. 14 is a diagram illustrating an application example of a medical probe that is equipped with an antenna device according to embodiments of the present disclosure.

The antenna device 30, which is mounted in the medical equipment 10, may include a plurality of radiation patterns 100. The radiation patterns 100 of the antenna device 30, which is mounted in the medical equipment 10, may conduct data communication in different frequency bands, respectively, and may conduct wireless power transmission/reception in a common frequency band. For example, each of the radiation patterns 100 may be set to be different from each other only in the position of the open boundary and to be equal to each other in the other design conditions.

Accordingly, a plurality of electronic devices (e.g., medical probes) 20a, 20b, and 20c may be connected to, for example, single medical equipment 10 in a wireless manner. Each of the electronic devices 20a, 20b, and 20c is capable of conducting wireless power transmission/reception in a common frequency band while conducting data communication with the medical equipment 10 in different frequency bands. As described above, the impedance by an open boundary is set differently depending on the length of the open boundary, and the frequency of a signal current that is applied to the active element arranged in the open boundary and each radiation pattern.

Figure 15:
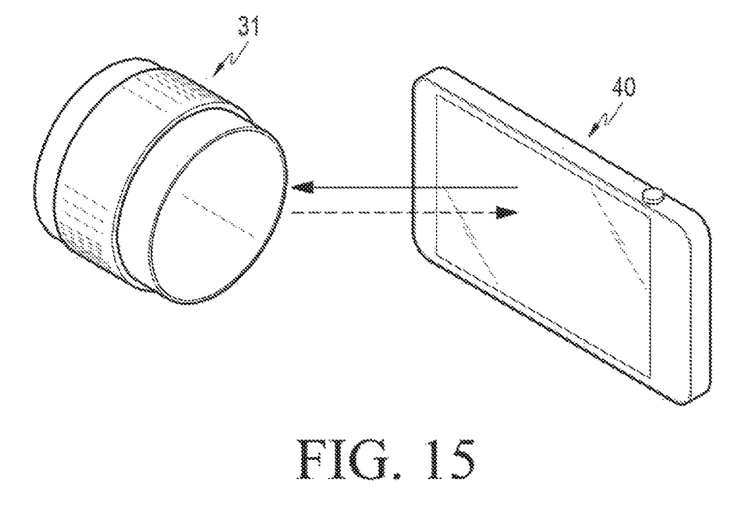
FIG. 15 is a diagram illustrating another example of an electronic device that is equipped with an antenna device according to embodiments of the present disclosure.

FIG. 15 is a diagram illustrating another example of an electronic device that is equipped with an antenna device according to embodiments of the present disclosure.

The embodiment illustrated in FIG. 15 exemplifies an electronic device that is connected to a portable terminal 40 in a wireless manner (e.g., a removable lens barrel). The lens barrel 31 may be connected to the portable terminal 40 in an electric manner, rather than a mechanical manner. For example, image information, which is input through the lens barrel 31, may be transmitted to the portable terminal 40 through a data communication frequency. At this time, the power of the lens barrel 31 may be provided from the portable terminal 40 in a wireless manner. When taking a photograph, the lens barrel is generally mechanically coupled to the portable terminal. However, upon being equipped with the antenna device, according to the embodiments of the present disclosure, the lens barrel 31 may transmit the input image information to the portable terminal 40 while receiving the power provided from the portable terminal 40 in a wireless manner.

The lens barrel 31 may have a battery pack that is embedded therein, and may receive the charging power of the battery pack with the power that is provided from a wireless charging device or the portable terminal 40 in a wireless manner.

In addition, the transmission of the information, which is input through the lens barrel 31, to the portable terminal 40, as well as the zoom-in/zoom-out operation of the lens barrel 31, may be controlled through the portable terminal 40. This is enabled by mounting the antenna devices, according to the embodiments of the present disclosure, to the lens barrel 31 and the portable terminal 40, respectively.

Figure 16:
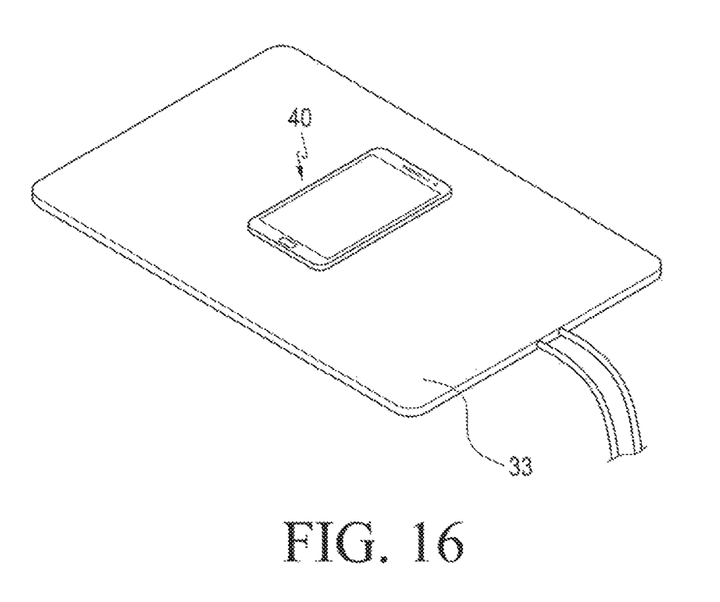
FIG. 16 is a diagram illustrating still another example of an electronic device that is equipped with an antenna device according to embodiments of the present disclosure.

FIG. 16 is a diagram illustrating still another example of an electronic device that is equipped with an antenna device according to embodiments of the present disclosure.

The electronic device 40 may be, for example, a portable terminal. However, upon being equipped with an antenna device, according to the embodiments of the present disclosure, the electronic device 40 may not only perform data communication with another electronic device (e.g., a personal computer), but may also be supplied with charging power through, for example, a personal computer. For example, a pad 33, which is equipped with an antenna device, according to the embodiments of the present disclosure, and the electronic device 40 are capable of transmitting/receiving power and data in a wireless manner. When the pad 33 is mounted on another electronic device or is provided as an accessory device form to another electronic device, the electronic device 40 is capable of conducting data communication with the other electronic device, to which the pad 33 is connected, while receiving power for charging from the other electronic device through the pad 33.

While the present disclosure has been shown and described with reference to certain embodiments thereof, it will be understood by those skilled in the art that various changes in form and details may be made therein without departing from the spirit and scope of the present disclosure as defined by the appended claims.

The invention claimed is:

1. An antenna device of an electronic device, the antenna device comprising:
   a radiation pattern configured to include at least one open boundary and a plurality of radiation units that are arranged with the open boundary interposed therebetween,
   wherein the open boundary has a length to satisfy an impedance of the open boundary in a range of $0.01\Omega$ to $500\Omega$ with respect to a frequency of a signal current in a first frequency band and forms a short circuit for the signal current in the first frequency band, and
   the radiation pattern forms a first resonance frequency in a first frequency band, and at least one of the radiation units forms a second resonance frequency in a second frequency band that is higher than the first frequency band such that the open boundary forms an open circuit for a signal current in the second frequency band.

2. The antenna device of claim 1, wherein the open boundary has a length that is formed to be smaller than one fourth of a signal wavelength of the second resonance frequency.

3. The antenna device of claim 1, wherein the first frequency band is a frequency band ranging from 5 MHz to 15 MHz.

4. The antenna device of claim 1, wherein the second frequency band is a frequency band ranging from 700 MHz to 65 GHz.

5. The antenna device of claim 1, wherein a plurality of open boundaries and the radiation units are alternately arranged to form a spiral shape.

6. The antenna device of claim 1, wherein the open boundary is arranged to surround a first radiation unit among the radiation units, and a second radiation unit among the radiation units is arranged to surround the open boundary.

7. The antenna device of claim 1, wherein some of the radiation units are combined with each other to form a third resonance frequency in a third frequency band that is higher than the first frequency band and is different from the second frequency band.

8. The antenna device of claim 1, wherein the radiation pattern is any one of an Archimedean spiral pattern, a log periodic spiral pattern, and a cavity-backed log periodic spiral pattern, in which a plurality of lines are arranged in a spiral shape that converges on a center.

9. The antenna device of claim 1, wherein the radiation pattern includes, among the radiation units, a first radiation unit surrounded by the open boundary and a second radiation unit arranged to surround the open boundary.

10. The antenna device of claim 9, wherein the second radiation unit has a closed loop shape.

11. The antenna device of claim 9, wherein the first radiation unit has a portion that protrudes in a direction approaching the second radiation unit.

12. An electronic device, the electronic device comprising:
a battery; and
an antenna device operably connected to the battery, the antenna device comprising:
a radiation pattern configured to include at least one open boundary and a plurality of radiation units that are arranged with the open boundary interposed therebetween,
wherein the radiation pattern forms a resonance frequency in a first frequency band, and at least one of the radiation units forms a resonance frequency in a second frequency band that is higher than the first resonance frequency band.

13. The electronic device of claim 12, wherein the open boundary is configured to:
form a short circuit for a signal current in the first frequency band, and
form an open circuit for a signal current in the second frequency band.

14. The electronic device of claim 12, wherein the open boundary has a length that is formed to be smaller than one fourth of a signal wavelength of the second resonance frequency.

15. The electronic device of claim 12, further comprising:
an active element configured to be arranged in the open boundary to electrically short-circuit or open the radiation units, which are arranged to be adjacent to each other with the open boundary interposed therebetween.

16. The electronic device of claim 15, wherein the active element includes a PIN diode, a microelectromechanical system (MEMS) switch, a bandpass filter, a low pass filter, or a single pole single throw (SPST) switch.

17. The electronic device of claim 12, wherein the first frequency band is a frequency band ranging from 5 MHz to 15 MHz.

* * * * *